(12) United States Patent
Ehlinger et al.

(10) Patent No.: US 10,511,515 B1
(45) Date of Patent: Dec. 17, 2019

(54) PROTOCOL BUFFER AVIONICS SYSTEM

(71) Applicant: Rockwell Collins, Inc., Cedar Rapids, IA (US)

(72) Inventors: Joshua J. Ehlinger, Marion, IA (US); Jeffrey R. Imig, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 88 days.

(21) Appl. No.: 15/690,052

(22) Filed: Aug. 29, 2017

(51) Int. Cl.
*H04L 12/26* (2006.01)
*H04L 29/06* (2006.01)

(52) U.S. Cl.
CPC ............ *H04L 43/14* (2013.01); *H04L 43/045* (2013.01); *H04L 69/08* (2013.01)

(58) Field of Classification Search
CPC ........ H04L 69/08; H04L 43/045; H04L 43/14
See application file for complete search history.

(56) References Cited

U.S. PATENT DOCUMENTS

| | | | |
|---|---|---|---|
| 6,545,601 B1 * | 4/2003 | Monroe | B64D 45/0015 340/3.1 |
| 6,671,589 B2 * | 12/2003 | Holst | G06F 8/61 244/1 R |
| 7,343,157 B1 * | 3/2008 | Mitchell | H04B 7/18506 455/11.1 |
| 8,688,857 B1 * | 4/2014 | Michael | G06F 16/9535 709/246 |
| 8,965,329 B1 * | 2/2015 | Jones | H04W 76/00 340/426.15 |
| 9,215,245 B1 * | 12/2015 | Rajab | H04L 63/1433 |
| 9,348,850 B1 * | 5/2016 | Fei | G06F 17/30292 |
| 9,787,687 B2 * | 10/2017 | Lof | H04L 63/0421 |
| 2011/0107152 A1 * | 5/2011 | Adams | G06F 11/323 714/43 |
| 2013/0110900 A1 * | 5/2013 | Des Jardins | H04N 21/4307 709/201 |
| 2015/0321348 A1 * | 11/2015 | Rollinson | B25J 9/065 700/253 |

(Continued)

OTHER PUBLICATIONS

Google Developers, Developer Guide, Protocol Buffers, Printed online at: https://developers.google.com/protocol-buffers/docs/overview, Jul. 17, 2017, 7 pages.

*Primary Examiner* — Hassan Kizou
*Assistant Examiner* — Deepa Belur
(74) *Attorney, Agent, or Firm* — Suiter Swantz pc llo

(57) ABSTRACT

A system may include a data network switch and an avionics computing device implemented in an aircraft. The avionics computing device may be configured to execute a protocol engine and an application. The avionics computing device may be further configured to receive first protocol buffer data from a source, the first protocol buffer data being packed data readable by the source. The avionics computing device may be further configured to, based on execution of the protocol engine, decode the first protocol buffer data into first structured data. The avionics computing device may be further configured to, based on execution of the protocol engine, encode second structured data as second protocol buffer data, the second protocol buffer data being packed data readable by a destination. The avionics computing device may be further configured to output the second protocol buffer data to the destination.

18 Claims, 10 Drawing Sheets

(56) References Cited

U.S. PATENT DOCUMENTS

| | | | |
|---|---|---|---|
| 2016/0027143 A1* | 1/2016 | Amidei | G06T 1/20 345/522 |
| 2017/0108612 A1* | 4/2017 | Aguib | G01V 7/06 |
| 2017/0184667 A1* | 6/2017 | Bhatt | G06F 11/1004 |
| 2017/0244762 A1* | 8/2017 | Kinder | H04L 63/1425 |
| 2018/0076825 A1* | 3/2018 | He | H03M 7/14 |
| 2018/0095760 A1* | 4/2018 | Guilford | G06F 9/3016 |
| 2018/0365082 A1* | 12/2018 | Richardson | G06F 9/541 |

\* cited by examiner

| ADDRESS | 0 | 1 | 2 | 3 | 4 |
|---|---|---|---|---|---|
| 0000360 | 00 | 02 | 03 | 05 | 12 |
| 0000361 | 03 | 01 | 12 | 03 | 0b |
| 0000362 | 12 | 03 | 0b | 1c | 1d |
| 0000363 | 03 | 1e | 0a | 0c | 0a |
| 0000364 | 0a | 0c | 0a | 05 | 04 |

FIG.8

PROTOCOL BUFFER AVIONICS SYSTEM

BACKGROUND

Messages transmitted between avionics computing devices may utilize multiple different programming languages, such as C++, Java, and Python. Currently, due to multiple different programming languages that may be used in an avionics system, installing a fully functioning and error-free avionics system requires substantial man-hours to debug and setup functional interfaces between avionics applications that utilize different programming languages. Additionally, debugging errors currently requires manually writing specific code for each data structure and each test scenario that may be involved with the avionics system. Further, there is currently no means for a technician to inspect message data in a human readable form without manually converting the machine language (e.g., binary or hexadecimal) into human readable structured data. Also, there is currently no means for a third-party computing device to access and exchange messages with applications running on the avionics system without writing specific code for each data structure.

SUMMARY

In one aspect, embodiments of the inventive concepts disclosed herein are directed to a system. The system may include a data network switch and an avionics computing device communicatively coupled and implemented in an aircraft. The avionics computing device may include a non-transitory computer-readable medium and a processor communicatively coupled to the non-transitory computer-readable medium. A protocol engine and an application may be maintained in the non-transitory computer-readable medium. By execution of the protocol engine and the at least one application, the avionics computing device may be configured to: receive first protocol buffer data from a source, the first protocol buffer data being packed data readable by the source; based on execution of the protocol engine, decode the first protocol buffer data into first structured data; based on execution of the protocol engine, encode second structured data as second protocol buffer data, the second protocol buffer data being packed data readable by a destination; and output the second protocol buffer data to the destination.

In a further aspect, embodiments of the inventive concepts disclosed herein are directed to a system. The system may include a data network switch and an vetronics computing device communicatively coupled and implemented in a vehicle. The vetronics computing device may include a non-transitory computer-readable medium and a processor communicatively coupled to the non-transitory computer-readable medium. A protocol engine and an application may be maintained in the non-transitory computer-readable medium. By execution of the protocol engine and the at least one application, the vetronics computing device may be configured to: receive first protocol buffer data from a source, the first protocol buffer data being packed data readable by the source; based on execution of the protocol engine, decode the first protocol buffer data into first structured data; based on execution of the protocol engine, encode second structured data as second protocol buffer data, the second protocol buffer data being packed data readable by a destination; and output the second protocol buffer data to the destination.

In a further aspect, embodiments of the inventive concepts disclosed herein are directed to a method. The method may include executing, by a processor of an avionics computing device implemented in an aircraft, a protocol engine. The method may include receiving, by the processor of the avionics computing device, first protocol buffer data from a source, the first protocol buffer data being packed data readable by the source. The method may include, based on execution of the protocol engine, decoding, by the processor of the avionics computing device, the first protocol buffer data into first structured data. The method may include, based on execution of the protocol engine, encoding, by the processor of the avionics computing device, second structured data as second protocol buffer data, the second protocol buffer data being packed data readable by a destination. The method may include outputting, by the processor of the avionics computing device, the second protocol buffer data to the destination.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 8 is a representation of exemplary packed protocol buffer data according to the inventive concepts disclosed herein.

DETAILED DESCRIPTION

Figure 1:
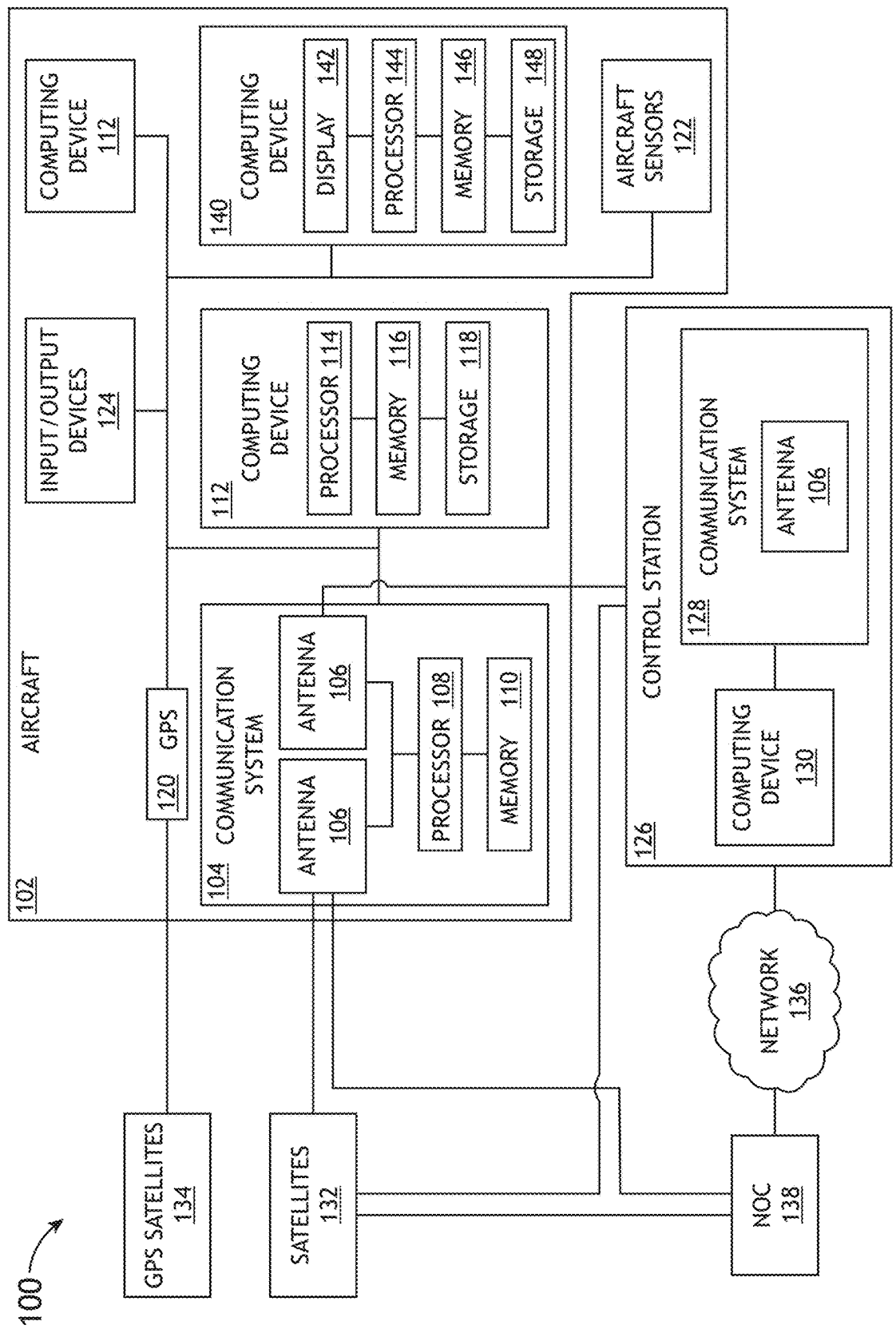
FIG. 1 is a view of an exemplary embodiment of a system including an aircraft, a control station, satellites, global positioning system (GPS) satellites, a network, and a network operations center (NOC) according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and a method. Embodiments may include a computing device configured to utilize protocol buffer data (e.g., protocol buffer messages) for communicating with a file system and/or application of another computing device. Protocol buffers are programming language-neutral and platform-neutral and provide an extensible means for serializing structured data. Protocol buffers allow for a platform neutral and programming language neutral means of communication. Embodiments may be configured to write and read structured data to and from various data streams and by using various programming languages while defining how data is to be structured once. For example, some embodiments allow for the exchange of data between applications (e.g., avionics applications and/or third-party non-avionics applications) written in different programming languages. Embodiments may eliminate the need to write special software for every data structure. Some embodiments may allow for an interface control document, which is a collection of protocol definition files, to be defined one time. Based on the interface control document, some embodiments may allow for an application to communicate with other applications over various communication protocols and various programming languages. Additionally, some embodiments may allow for test scripts to be automatically generated for testing. Further, some embodiments may be configured to utilize remote procedure calls such that, for example, a first application may execute code in a second application. Some embodiments, allow for a third-party non-avionics computing device to communicate with and/or modify data stored on an avionics computing device. Some embodiments allow for integration of avionics computing devices with non-avionics computing devices.

Some embodiments may include a computing device (e.g., an avionics computing device or a non-avionics computing device) having a protocol engine and an application stored in a non-transitory computer-readable medium. By executing the protocol engine and/or the application, the computing device may be configured to send and receive messages as protocol buffer data. For example, by executing the protocol engine and the application, the computing device may be configured to receive a message as protocol buffer data from a source (e.g., another application, an application of another computing device, and/or a file system), where the protocol buffer data is packed data readable by the source. Based at least on execution of the protocol engine, the computing device may be configured to decode the protocol buffer data into human-readable structured data. Similarly, for example, the computing device may be configured to send a message as protocol buffer data to a destination (e.g., another application, an application of another computing device, and/or a file system). For example, based at least on execution of the protocol engine, the computing device may be configured to encode structured data as protocol buffer data, where the protocol buffer data is packed data readable by the destination. The computing device may be configured to output the protocol buffer data to the destination. Additionally, the computing device may be configured to generate a graphical user interface based at least on structured data. The graphical user interface may include a representation of fields and data values of the structured data. Further, the computing device may be configured to output the graphical user interface to a display for presentation to a user, wherein the data values are user editable based on receipt of a user input to edit the data values. For example, such a graphical user interface may be used for debugging errors.

Some embodiments may include a plurality of communicatively coupled computing devices (e.g., avionics computing devices and/or non-avionics computing devices), which each have a protocol engine and an application stored in a non-transitory computer-readable medium such that each of the plurality of computing devices may be configured to send and receive messages as protocol buffer data.

Embodiments may improve the functioning of a computing device (e.g., an avionics computing device), itself, by providing a common and open interface definition for inter-application communication, by providing self-documenting interface definitions, by enabling backwards compatibility, and by reducing errors in source code which might otherwise be caused by human error. Additionally, embodiments may improve the field of aviation by improving aircraft safety by reducing the occurrence of errors in source code stored in and utilized by an avionics computing device.

Referring now to FIG. 1, an exemplary embodiment of a system 100 according to the inventive concepts disclosed herein includes at least one aircraft 102, a control station 126, satellites 132, global positioning system (GPS) satellites 134, a network 136, and a network operations center (NOC) 138. Some or all of the aircraft 102, the control station 126, the satellites 132, the GPS satellites 134, the network 136, and the NOC 138 may be communicatively coupled at any given time.

The aircraft 102 includes at least one communication system 104, a plurality of computing devices 112 (which may also be referred to as aircraft computing devices, helicopter computing devices, or vehicular computing devices as may be appropriate), a GPS device 120, aircraft sensors 122, input/output devices 124, and a computing device 140 (e.g., a non-avionics computing device), as well as other systems, equipment, and devices commonly included in aircraft. Some or all of the communication system 104, the computing devices 112, the GPS device 120, the aircraft sensors 122, the input/output devices 124, the computing device 140, and any other systems, equipment, and devices commonly included in the aircraft 102 may be communicatively coupled. While not shown, in some embodiments, the aircraft 102 may optionally include a NOC or include components (e.g., at least one computing device 112 and/or the communication system 104) configured to perform functionality similar to the NOC 138. The aircraft 102 may be implemented as any suitable aircraft, such as a helicopter or airplane. While the system 100 is exemplarily shown as including the aircraft 102, in some embodiments the inventive concepts disclosed herein may be implemented in or on non-vetronics computing devices and vetronics computing devices of any suitable vehicle (e.g., an automobile, train, submersible craft, watercraft, or spacecraft) or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles, the satellites 132, the NOC 138, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, a passenger broadband service connection, a safety services connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the communication system 104 for transmission to an off-board destination (e.g., satellites 132, NOC 138, control station 126). Likewise, each computing device 112 may be configured to receive data from another computing device 112 as well as from the communication system 104 transmitted from off-board sources (e.g., satellites 132, NOC 138, control station 126). The computing device 112 may include or may be implemented as and/or be configured to perform the functionality of any suitable aircraft system, such as an engine indication and crew alerting system (EICAS) computing device (e.g., 112-2), a flight management system (FMS) computing device (e.g., 112-3), an integrated flight information system (IFIS) computing device (e.g., 112-4), an information management system (IMS) computing device (e.g., 112-5), an onboard maintenance system (OMS) computing device (e.g., 112-6), a terrain awareness and warning system (TAWS) computing device (e.g., 112-7), a secure server router computing device (e.g., 112-8), and a cargo handling and aerial delivery system (CHADCS) computing device (e.g., 112-9). (See, e.g., FIG.

4.) The processor 114 may be configured to run various software applications or computer code stored (e.g., maintained) in a non-transitory computer-readable medium (e.g., memory 116 or storage 118) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

For example, an exemplary computing device 112 may include a protocol engine and an application stored in a non-transitory computer-readable medium (e.g., memory 116 and/or storage 118). The processor 114 may be configured to execute the protocol engine and the application. By executing the protocol engine and the application, the computing device 112 may be configured to receive one or more messages as protocol buffer data from a source (e.g., another application, an application of another computing device, and/or a file system), where the protocol buffer data is packed data (e.g., serialized or encoded data; e.g., byte packed data) readable by the source. Based at least on execution of the protocol engine, the computing device 112 may be configured to decode the protocol buffer data into structured data. Similarly, the computing device 112 may be configured to send one or more messages as protocol buffer data to a destination (e.g., another application, an application of another computing device, and/or a file system). For example, based at least on execution of the protocol engine, the computing device 112 may be configured to encode structured data as protocol buffer data, where the protocol buffer data is packed data readable by the destination. The computing device 112 may be configured to output the protocol buffer data to the destination.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, the input/output devices 124, and the computing device 140). The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the aircraft 102, in other embodiments, the GPS device 120 may be implemented in or on any type of vehicle, such as automobiles, spacecraft, trains, watercraft, or submersible craft.

The computing device 140 of the aircraft 102 may include a display 142 (e.g., a touchscreen display), at least one processor 144, memory 146, and storage 148, as well as other components, equipment, and/or devices commonly included in a computing device, all of which may be communicatively coupled to one another. The computing device 140 may be implemented as a non-vetronics computing device (e.g., a non-avionics computing device). For example, the computing device 140 may be implemented as a third-party computing device (e.g., a customer's computing device) or mission computer. The computing device 140 may be configured to exchange (e.g., send and/or receive via a secure wireless connection) a stream of data to and/or from an avionics computing device (e.g., 112). The computing device 140 may be implemented as any suitable computing device, such as a wearable computing device and/or a mobile computing device (e.g., a laptop computing device, a tablet computing device, or a smart phone). The processor 144 may be configured to run various software applications or computer code stored (e.g., maintained) in a non-transitory computer-readable medium (e.g., memory 146 and/or storage 148) and configured to execute various instructions or operations. Additionally, for example, the computing device 140 or the processor 144 may be implemented as a special purpose computer or a special purpose processor configured (e.g., programmed) to execute instructions for performing any or all of the operations disclosed throughout. In some embodiments, the aircraft 102 may include any suitable number of computing devices 140.

For example, the computing device 140 may include a protocol engine and an application stored in a non-transitory computer-readable medium (e.g., memory 146 and/or storage 148). The processor 144 may be configured to execute the protocol engine and the application. By executing the protocol engine and the application, the computing device 140 may be configured to receive one or more messages as protocol buffer data from a source (e.g., another application, an application of another computing device, and/or a file system), where the protocol buffer data is packed data (e.g., serialized or encoded data; e.g., byte packed data) readable by the source. Based at least on execution of the protocol engine, the computing device 140 may be configured to decode the protocol buffer data into structured data. Similarly, the computing device 140 may be configured to send one or more messages as protocol buffer data to a destination (e.g., another application, an application of another computing device, and/or a file system). For example, based at least on execution of the protocol engine, the computing device 140 may be configured to encode structured data as protocol buffer data, where the protocol buffer data is packed data readable by the destination. The computing device 140 may be configured to output the protocol buffer data to the destination.

While the communication system 104, the computing devices 112, the GPS device 120, the aircraft sensors 122, the input/output devices 124, and the computing device 140 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 includes at least one communication system 128 and at least one computing device 130, as well as other systems, equipment, and devices commonly included in a control station. Some or all of the communication system 128, the computing device 130, and other systems, equipment, and devices commonly included in a control station may be communicatively coupled. The control station 126 may be implemented as a fixed location ground control station (e.g., a ground control station of an air traffic control tower, or a ground control station of a network operations center (e.g., 138)) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to the NOC 138 (e.g., via the network 136).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112.

While the antennas 106 are exemplarily depicted as being implemented in the aircraft 102 and the control station 126, in some embodiments, antennas 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 132.

The network 136 may be implemented as any suitable network or combination of networks. For example, the network 136 may include or be implemented as the internet, a portion of the internet (such as a secured optical fiber network), an intranet, a wide area network (WAN), a local area network (LAN), and/or a mobile telecommunications network (e.g., a third generation (3G) network or a fourth generation (4G) network)). While the system 100 is exemplarily shown as including the network 136, the system 100 or various components of the system 100 may include or be communicatively coupled via any suitable number and any suitable types of networks.

The NOC 138 may connect a particular type of communications (e.g., satellite communications with the satellites 132 and/or aircraft communications with the aircraft 102) with the network 136.

While FIG. 1 exemplarily includes elements as shown, in some embodiments, one or more of the elements of the system 100 may be omitted, or the system 100 may include other elements. For example, one or more of the GPS satellites 134, satellites 132, the control station 126, the network 136, or the NOC 138 may be optional. Additionally, while an embodiment has been depicted as including one control station (e.g., the control station 126), other embodiments may include any number of control stations of various types positioned or moving anywhere in the system 100.

Figure 2:
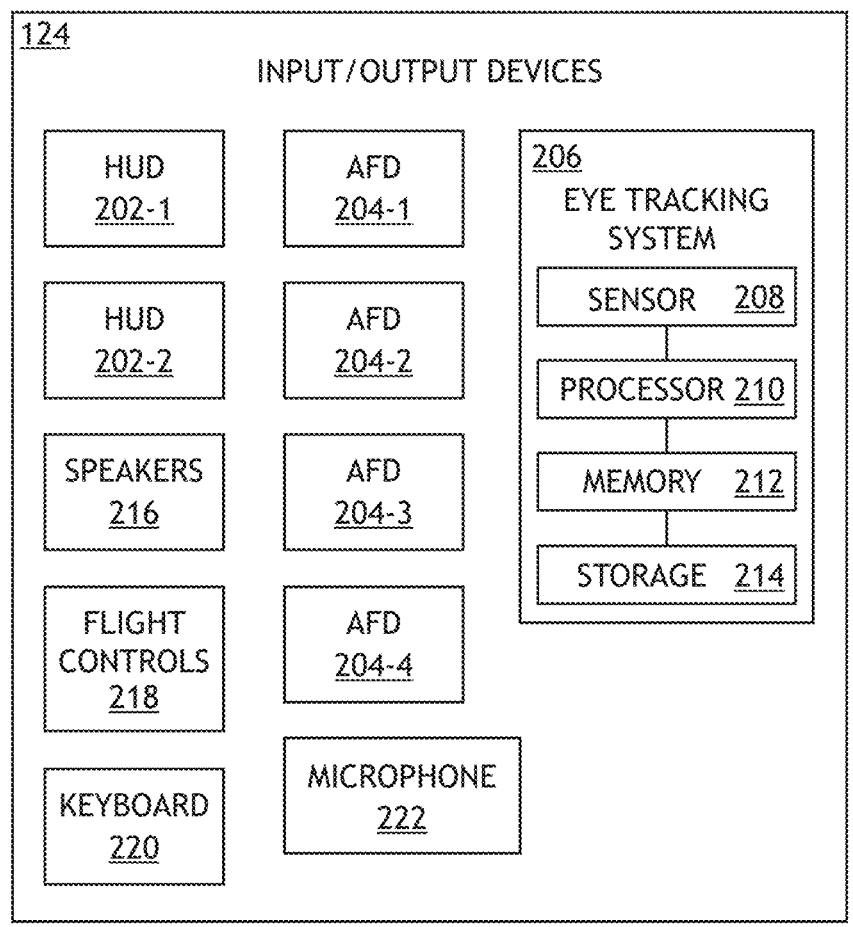
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one adaptive flight display (AFD), or a combination thereof), at least one eye tracking system 206, speakers 216, flight controls 218, at least one keyboard 220, at least one microphone 222, or a combination thereof, some or all of which may be communicatively coupled at any given time. While FIG. 2 depicts the various exemplary input/output devices 124, the input/output devices 124 may include any suitable input/output devices.

For example, the displays of the input/output devices 124 may include two HUDs 202-1, 202-2 (which may collectively be referred to as HUDs 202) and four AFDs 204-1, 204-2, 204-3, 204-4 (which may collectively be referred to as AFDs 204). Each of the HUDs 202 and the AFDs 204 may be configured to present streams of images (e.g., as video or still images) to a user (e.g., a pilot or an operator). In some embodiments, the HUDs 202 and/or AFDs 204 may be implemented as or include a touchscreen display. In some embodiments, one or more of the HUDs 202 and the AFDs 204 may include an integrated computing device (which may be implemented and function similarly to one of the computing devices 112 of FIG. 1) and/or integrated computing device components (which may be implemented and function similarly to components of one of the computing devices 112 of FIG. 1). Each of the HUDs 202 and the AFDs 204 may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
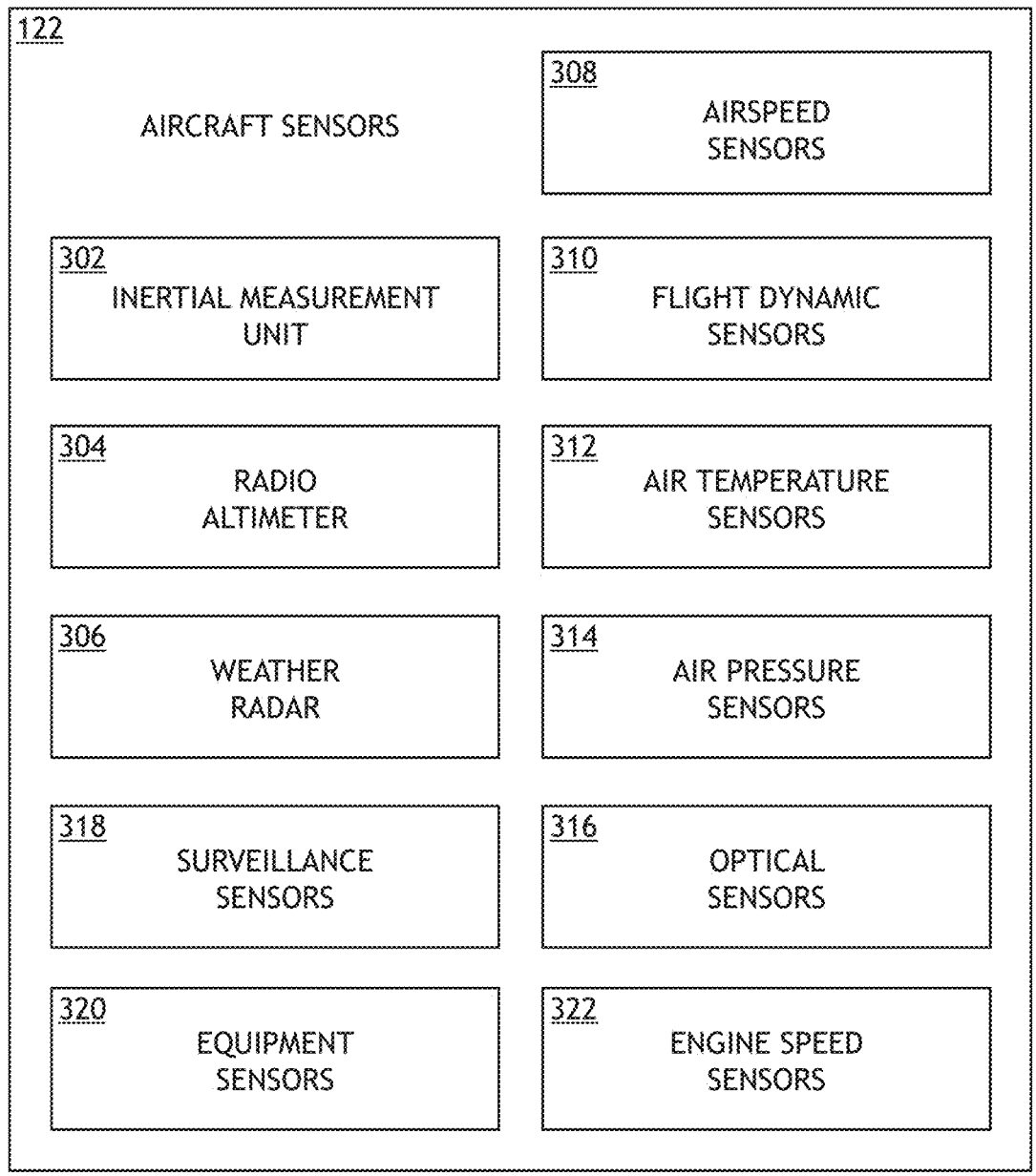
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, or a combination thereof). For example, the aircraft sensors 122 may include an inertial measurement unit 302, a radio altimeter 304, weather radar 306, airspeed sensors 308, flight dynamic sensors 310 (e.g., configured to sense pitch, roll, and/or yaw), air temperature sensors 312, air pressure sensors 314, optical sensors 316 (e.g., cameras configured to capture images in the visible light spectrum and/or the infrared spectrum), surveillance sensors 318, equipment sensors 320 (e.g., electrical system sensors, hydraulic system sensors, bleed air sensors, environmental conditioning sensors, fuel sensors, and/or fire warning/suppression sensors), and engine speed sensors 322, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft roll, aircraft yaw, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 108, processor 210, or a combination thereof).

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the aircraft 102, some embodiments may include vehicle sensors implemented on any suitable vehicle according to the inventive concepts disclosed herein.

Figure 4:
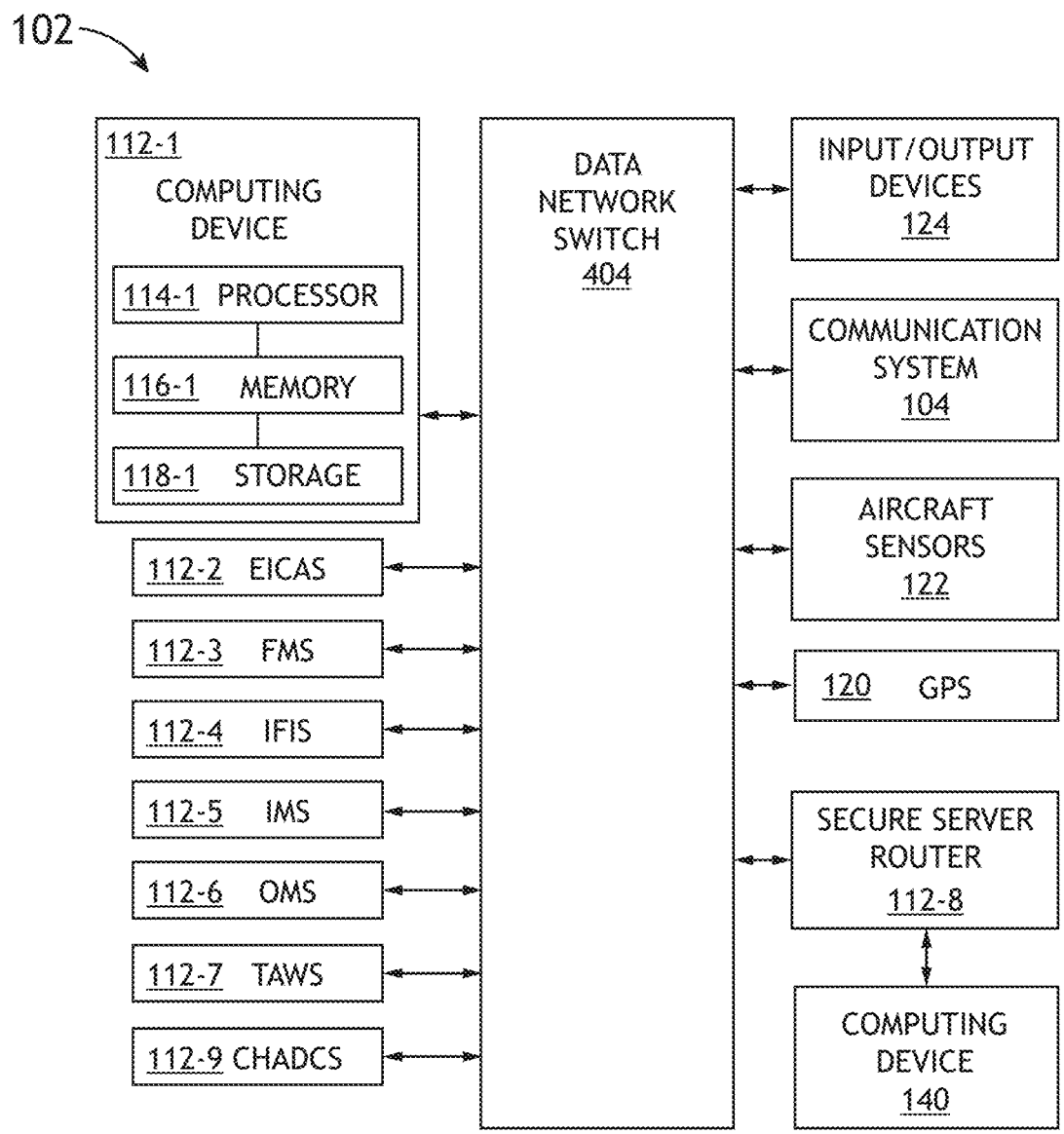
FIG. 4 is a view of exemplary devices of the aircraft of FIG. 1 communicatively coupled via a data network switch of an exemplary embodiment according to the inventive concepts disclosed herein.

Referring now to FIG. 4, various exemplary devices of the aircraft 102 of FIG. 1 communicatively coupled via a data network switch 404 (e.g., an avionics full-duplex Ethernet (AFDX) switch) are shown. For example, a plurality of computing devices 112 (e.g., avionics computing devices), the input/output devices 124, the communication system 104, vehicular sensors (e.g., the aircraft sensors 122), and the GPS device 120 may be communicatively coupled via the data network switch 404. Each of the plurality of avionics computing devices (e.g., 112-1, 112-2, 112-3, 112-4, 112-5, 112-6, 112-7, 112-8, 112-9), the input/output devices 124, the communication system 104, vehicular sensors (e.g., the aircraft sensors 122), and the GPS device 120 may be configured to exchange (e.g., send and/or receive) avionics data with one another via the data network switch 404. While the plurality of computing devices 112, the input/output devices 124, the communication system 104, the aircraft sensors 122, and the GPS device 120 are exemplarily shown as being communicatively coupled via the data network switch 404, in some embodiments some or all of the plurality of computing devices 112, the input/output devices 124, the communication system 104, the vehicular sensors (e.g., the aircraft sensors 122), and the GPS device 120 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of vetronics computing devices, such as a plurality of avionics computing devices (e.g., which may be implemented in one or more integrated modular avionics (IMA) cabinets). The plurality of avionics computing devices may include a first avionics computing device 112-1, a crew alerting system (CAS) computing device (e.g., an engine indication and crew alerting system (EICAS) computing device 112-2), a flight management system (FMS) computing device 112-3, an integrated flight information system (IFIS) computing device 112-4, an information management system (IMS) computing device 112-5, an onboard maintenance system (OMS) computing device 112-6, a terrain awareness and warning system (TAWS) computing device 112-7, a secure server router computing device 112-8, a CHADCS computing device 112-9, an automatic dependent surveillance (ADS) computing device (not shown), and a traffic collision avoidance system (TCAS) computing device (not shown), as well as other avionics computing devices commonly implemented in an aircraft. Additionally, the input/output devices 124, the communication system 104, the aircraft sensors 122, the data network switch 404, and the GPS device 120 may be considered to be devices of the plurality of avionics computing devices and may be implemented similarly as and function similarly as avionics devices (e.g., 112-1, 112-2, 112-3, 112-4, 112-5, 112-6, 112-7, 112-8, 112-9) as disclosed throughout. Each of the plurality of avionics computing devices (e.g., 112-1, 112-2, 112-3, 112-4, 112-5, 112-6, 112-7, 112-8, 112-9) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the first avionics computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1.

The plurality of avionics computing devices (e.g., 112-1, 112-2, 112-3, 112-4, 112-5, 112-6, 112-7, 112-8, 112-9) and/or processors thereof (e.g., 114-1) may be implemented as special purpose computers (e.g., the first avionics computing device 112-1, the EICAS computing device 112-2, the FMS computing device 112-3, the IFIS computing device 112-4, the IMS computing device 112-5, the OMS computing device 112-6, the TAWS computing device 112-7, the secure server router computing device 112-8, the CHADCS computing device 112-9) and/or special purpose processors (e.g., the processor 114-1 of the first avionics computing device 112-1 programmed to execute instructions for operations as disclosed throughout, a processor of the EICAS computing device 112-2 programmed to execute instructions for performing EICAS operations as disclosed throughout, a processor of the FMS computing device 112-3 programmed to execute instructions for performing FMS operations as disclosed throughout, a processor of the IFIS computing device 112-4 programmed to execute instructions for performing IFIS operations as disclosed throughout, a processor of the IMS computing device 112-5 programmed to execute instructions for performing IMS operations as disclosed throughout, a processor of the OMS computing device 112-6 programmed to execute instructions for performing OMS operations as disclosed throughout, a processor of the TAWS computing device 112-7 programmed to execute instructions for performing TAWS operations as disclosed throughout, a processor of the secure server router computing device 112-8 programmed to execute instructions for performing secure server router operations as disclosed throughout, and a processor of the CHADCS computing device 112-9 programmed to execute instructions for performing CHADCS operations as disclosed throughout) configured to execute instructions for performing any or all of the operations disclosed throughout.

For example, each of the plurality of avionics computing devices (e.g., 112-1, 112-2, 112-3, 112-4, 112-5, 112-6, 112-7, 112-8, 112-9) may include a protocol engine and at least one application stored in a non-transitory computer-readable medium (e.g., memory 116-1 and/or storage 118-1). A processor (e.g., 114-1) of each of the plurality of avionics computing devices (e.g., 112-1, 112-2, 112-3, 112-4, 112-5, 112-6, 112-7, 112-8, 112-9) may be configured to execute the protocol engine and the application. By executing the protocol engine and the application, each of the plurality of avionics computing devices (e.g., 112-1, 112-2, 112-3, 112-4, 112-5, 112-6, 112-7, 112-8, 112-9) may be configured to receive one or more messages as protocol buffer data from a source (e.g., another application, an application of another computing device, and/or a file system), where the protocol buffer data is packed data (e.g., serialized or encoded data; e.g., byte packed data) readable by the source. Based at least on execution of the protocol engine, each of the plurality of avionics computing devices (e.g., 112-1, 112-2, 112-3, 112-4, 112-5, 112-6, 112-7, 112-8, 112-9) may be configured to decode the protocol buffer data into structured data. Similarly, each of the plurality of avionics computing devices (e.g., 112-1, 112-2, 112-3, 112-4, 112-5, 112-6, 112-7, 112-8, 112-9) may be configured to send one or more messages as protocol buffer data to a destination (e.g., another application, an application of another computing device, and/or a file system). For example, based at least on execution of the protocol engine, each of the plurality of avionics computing devices (e.g., 112-1, 112-2, 112-3, 112-4, 112-5, 112-6, 112-7, 112-8, 112-9) may be configured to encode structured data as protocol buffer data, where the protocol buffer data is packed data readable by the destination. Each of the plurality of avionics computing devices (e.g., 112-1, 112-2, 112-3, 112-4, 112-5, 112-6, 112-7, 112-8, 112-9) may be configured to output the protocol buffer data to the destination.

The EICAS computing device 112-2 may be configured to provide aircraft crew with information (e.g., as annunciations (e.g., as messages and/or alerts) and instrumentation (e.g., which may be graphically displayed on any suitable display)) about engines and other systems of the aircraft 102. A processor of the EICAS computing device 112-2 may be configured to perform any of various, suitable operations, which are commonly performed by EICASs, as would be appreciated by those skilled in the art, such as sending and/or receiving messages. For example, the EICAS computing device 112-2 may be configured to send avionics data (e.g., EICAS data) to the secure server router computing device 112-8. In addition to performing commonly performed operations, some embodiments include a processor of the EICAS computing device 112-2 being configured (e.g., programmed) to perform additional operations.

The FMS computing device 112-3 may be configured to automate various in-flight tasks, such as managing a flight plan of the aircraft 102. A processor of the FMS computing device 112-3 may be configured to perform any of various, suitable operations, which are commonly performed by FMSs, as would be appreciated by those skilled in the art, such as sending and/or receiving messages. For example, the FMS computing device 112-3 may be configured to send avionics data (e.g., FMS data) to the secure server router computing device 112-8. In addition to performing commonly performed operations, some embodiments include the processor of the FMS computing device 112-3 being configured (e.g., programmed) to perform additional operations.

A processor of the IFIS computing device 112-4 may be configured to perform any of various, suitable operations, which are commonly performed by IFISs, as would be appreciated by those skilled in the art, such as sending and/or receiving messages. For example, the IFIS computing device 112-4 may be configured to send avionics data (e.g., IFIS data) to the secure server router computing device 112-8. In addition to performing commonly performed operations, some embodiments include the processor of the IFIS computing device 112-4 being configured (e.g., programmed) to perform additional operations.

A processor of the IMS computing device 112-5 may be configured to perform any of various, suitable operations, which are commonly performed by IMSs, as would be appreciated by those skilled in the art, such as sending and/or receiving messages. For example, the IMS computing device 112-5 may be configured to send avionics data (e.g., IMS data) to the secure server router computing device 112-8. In addition to performing commonly performed operations, some embodiments include the processor of the IMS computing device 112-5 being configured (e.g., programmed) to perform additional operations.

A processor of the OMS computing device 112-6 may be configured to perform any of various, suitable operations, which are commonly performed by OMSs, as would be appreciated by those skilled in the art, such as collecting and monitoring health data and sending and/or receiving messages. For example, the OMS computing device 112-6 may be configured to send avionics data (e.g., OMS data) to the secure server router computing device 112-8. In addition to performing commonly performed operations, some embodiments include the processor of the OMS computing device 112-6 being configured (e.g., programmed) to perform additional operations.

A processor of the TAWS computing device 112-7 may be configured to perform any of various, suitable operations, which are commonly performed by TAWSs, as would be appreciated by those skilled in the art, such as sending and/or receiving messages. For example, the TAWS computing device 112-7 may be configured to send avionics data (e.g., TAWS data) to the secure server router computing device 112-8. In addition to performing commonly performed operations, some embodiments include the processor of the TAWS computing device 112-7 being configured (e.g., programmed) to perform additional operations.

The secure server router computing device 112-8 may be configured to access, receive, and/or collect avionics data from any of the avionics computing devices (e.g., 112-1, 112-2, 112-3, 112-4, 112-5, 112-6, 112-7, 112-8), the input/output devices 124, the communication system 104, vehicular sensors (e.g., the aircraft sensors 122), and the GPS device 120. For example, the processor of the secure server router computing device 112-8 may be configured to send and/or receive messages to and/or from other devices (e.g., another computing device 112 (e.g., another avionics computing device), the input/output devices 124, the communication system 104, the aircraft sensors 122, the GPS device 120, the data network switch 404, the computing device 140, an off-board device, or a combination thereof). For example, such messages may be transmitted by another device, routed over network components (e.g., busses) through the data network switch 404, and received by the secure server router computing device 112-8.

In some embodiments, the secure server router computing device 112-8 may be configured to establish secure wireless connections to a non-avionics computing device 140, which may be located in the aircraft 102. A non-avionics computing device may include any computing device that is not part of the avionics of an aircraft. Additionally, for example, the secure server router computing device 112-8 may be configured to exchange data with a ground communication system by using dual cellular, Wi-Fi, and/or satellite communication (SATCOM) networks. The secure server router computing device 112-8 may be configured to utilize ARINC-834-4 service to provide secure server router status and to rebroadcast avionics data (e.g., avionic messages). Further, the secure server router computing device 112-8 may be configured to interface with avionics computing devices (e.g., 112-1, 112-2, 112-3, 112-4, 112-5, 112-6, 112-7, 112-9) to access live avionics data (e.g., avionics messages). In an exemplary embodiment, the secure server router computing device 112-8 may be implemented as a flight operation and maintenance exchange (FOMAX) computing device.

Additionally, the secure server router computing device 112-8 may be configured to filter (e.g., select relevant portions of) available avionics data based at least on a predetermined relevance to an application (e.g., application 706 of FIG. 7) stored in and executed by the non-avionics computing device 140. The secure server router computing device 112-8 may be programmed with data indicative of which avionics data is relevant to the application. Further, the secure server router computing device 112-8 may be configured to output the filtered avionics data to the non-avionics computing device 140. For example, the secure server router computing device 112-8 may be configured to output the filtered avionics data to an antenna (e.g., a WIFI antenna 406) for transmission via a secure wireless connection to the non-avionics computing device 140. A processor of the secure server router computing device 112-8 may be configured to perform any of various, suitable operations, which are commonly performed by secure server routers, as would be appreciated by those skilled in the art, such as sending and/or receiving messages. In addition to performing commonly performed operations, some embodiments include the processor of the secure server router computing device 112-8 being configured (e.g., programmed) to perform additional operations.

While exemplary functionality of the secure server router computing device 112-8 has been described with respect to an exemplary embodiment, in some embodiments processor(s) of any or all of the plurality of avionics computing devices (e.g., 112-2, 112-3, 112-4, 112-5, 112-6, 112-7, 112-8, 112-9) may be configured (e.g., programmed) similarly as the processor of the secure server router computing device 112-8 to perform similar operations.

In addition to performing commonly performed operations, some embodiments include one or more of the plurality of computing devices (e.g., the plurality of avionics computing devices (e.g., 112-2, 112-3, 112-4, 112-5, 112-6, 112-7, 112-8, 112-9) being configured (e.g., programmed) to perform additional operations.

While the first avionics computing device 112-1, the EICAS computing device 112-2, the FMS computing device 112-3, the IFIS computing device 112-4, the IMS computing device 112-5, the OMS computing device 112-6, the TAWS computing device 112-7, the secure server router computing device 112-8, and the CHADCS computing device 112-9 of the aircraft 102 have been exemplarily depicted as being implemented as separate avionics computing devices, in some embodiments, some or all of the first avionics computing device 112-1, the EICAS computing device 112-2, the FMS computing device 112-3, the IFIS computing device 112-4, the IMS computing device 112-5, the OMS computing device 112-6, the TAWS computing device 112-7, the secure server router computing device 112-8, and the CHADCS computing device 112-9 may be implemented as a single integrated computing device or as any number of integrated and/or partially integrated computing devices.

Additionally, in some embodiments, the data network switch 404 may be implemented similarly as and function similarly to one of the avionics computing devices (e.g., 112-1, 112-2, 112-3, 112-4, 112-5, 112-6, 112-7, 112-8, or 112-9) or include components that function similarly to components of one of the avionics computing devices. For example, the data network switch 404 may include an integrated computing device (which may be implemented and function similarly to one of the computing devices 112 (e.g., one of the avionics computing devices (e.g., 112-1, 112-2, 112-3, 112-4, 112-5, 112-6, 112-7, 112-8, 112-9))) and/or integrated computing device components (which may be implemented and function similarly to components of one of the computing devices 112 of FIG. 1).

Further, while the plurality of avionics computing devices has been exemplarily depicted and described with respect to FIG. 4 as including the first avionics computing device 112-1, the EICAS computing device 112-2, the FMS computing device 112-3, the IFIS computing device 112-4, the IMS computing device 112-5, the OMS computing device 112-6, the TAWS computing device 112-7, the secure server router computing device 112-8, and the CHADCS computing device 112-9, in some embodiments, the plurality of avionics computing devices may omit one or more of the described and depicted avionics computing devices, include additional numbers of such avionics computing devices, and/or include other types of suitable avionics computing devices.

The non-avionics computing device 140 may be configured to send and/or receive data (e.g., messages) with one or more of the avionics computing devices (e.g., 112-1, 112-2, 112-3, 112-4, 112-5, 112-6, 112-7, 112-8, 112-9). For example, the non-avionics computing device 140 may be configured to receive filtered avionics data via a wireless connection (e.g., a secure wireless connection) from one of the avionics computing devices (e.g., the secure server router computing device 112-8). Additionally, the processor 144 of the non-avionics computing device 140 may be configured to execute a protocol engine and at least one application stored in the at least one non-avionics non-transitory computer-readable medium (e.g., memory 146 and/or storage 148). By executing the protocol engine and the application, the non-avionics computing device 140 may be configured to receive one or more messages as protocol buffer data from a source (e.g., another application, an application of another computing device, and/or a file system), where the protocol buffer data is packed data (e.g., serialized or encoded data; e.g., byte packed data) readable by the source. Based at least on execution of the protocol engine, the non-avionics computing device 140 may be configured to decode the protocol buffer data into structured data. Similarly, the non-avionics computing device 140 may be configured to send one or more messages as protocol buffer data to a destination (e.g., another application, an application of another computing device, and/or a file system). For example, based at least on execution of the protocol engine, the non-avionics computing device 140 may be configured to encode structured data as protocol buffer data, where the protocol buffer data is packed data readable by the destination. The non-avionics computing device 140 may be configured to output the protocol buffer data to the destination. Additionally, the non-avionics computing device 140 may be configured to generate a graphical user interface based at least on at least one of the first structured data and the second structured data. The graphical user interface may include a representation of fields and data values of at least one of the first structured data and the second structured data. Further, the non-avionics computing device 140 may be configured to output the graphical user interface to the display 142 for presentation to a user, wherein the data values are user editable based on receipt of a user input to edit the data values.

Figure 5:
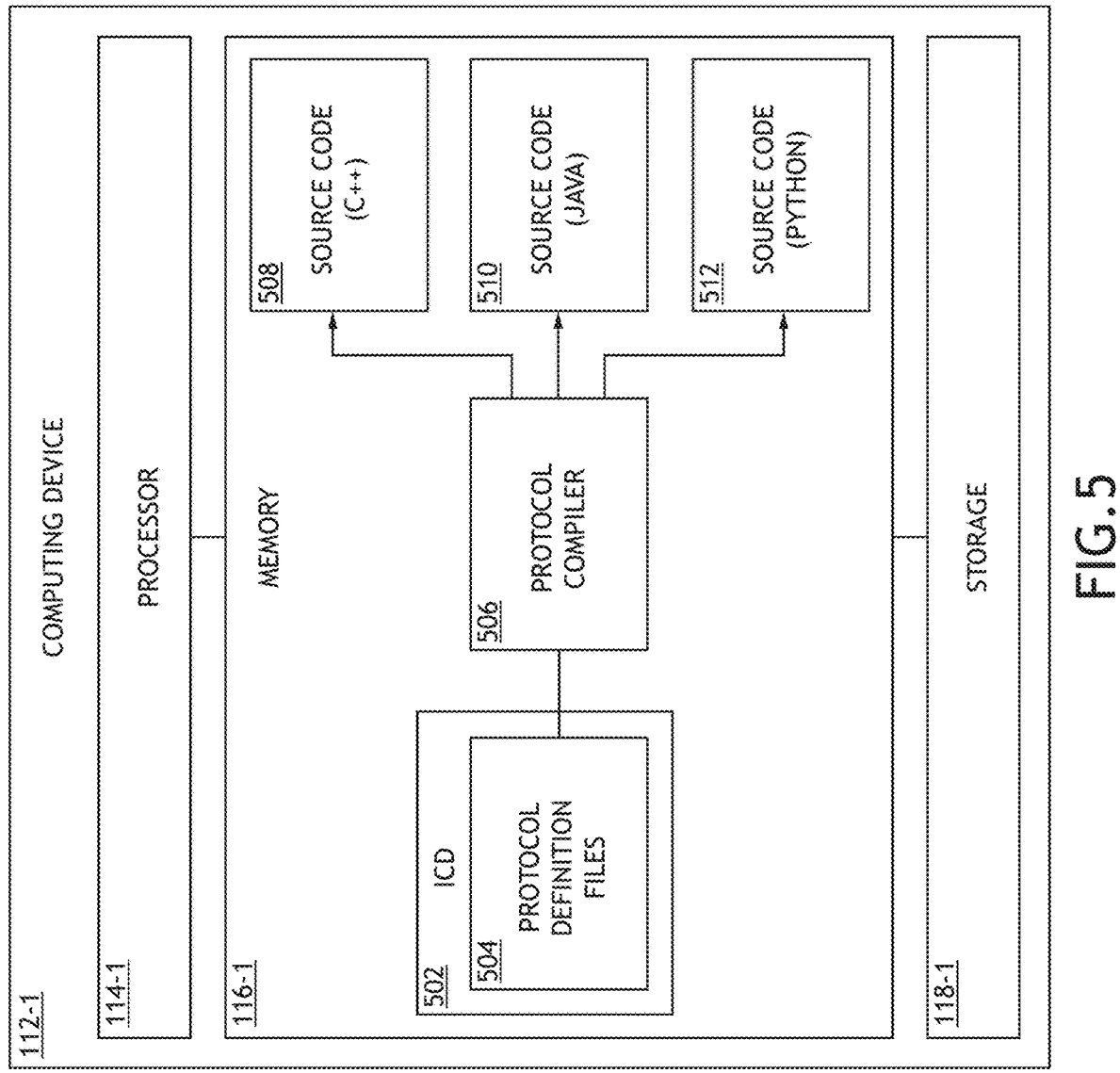
FIG. 5 is an exemplary view of the avionics computing device of FIG. 4 according to the inventive concepts disclosed herein.

Referring now to FIG. 5, the avionics computing device 112-1 of FIG. 4 is shown. The avionics computing device 112-1 may include an interface control document (ICD) 502, a protocol compiler 506, and source code 508, 510, 512 maintained (e.g., stored) in the memory 116-1. The ICD 502 may include one or more protocol definition files 504. Each of the protocol definition files define how data is to be structured. Based on the ICD 502, the processor 114-1 may execute the protocol compiler 506 to generate the source code 508, 510, 512. Each of the source code 508, 510, 512 may be used with a target environment. For example, source code 508 may be associated with a target environment programmed with the C++ language. For example, source code 510 may be associated with a target environment programmed with the Java language. For example, source code 512 may be associated with a target environment programmed with the Python language.

While the avionics computing device 112-1 is exemplarily shown as having software elements as shown and described, in some embodiments, other computing devices (e.g., vetronics computing devices, avionics computing devices, non-vetronics computing devices, and/or non-avionics computing devices) may have similar software elements with similar functionality.

Figure 6:
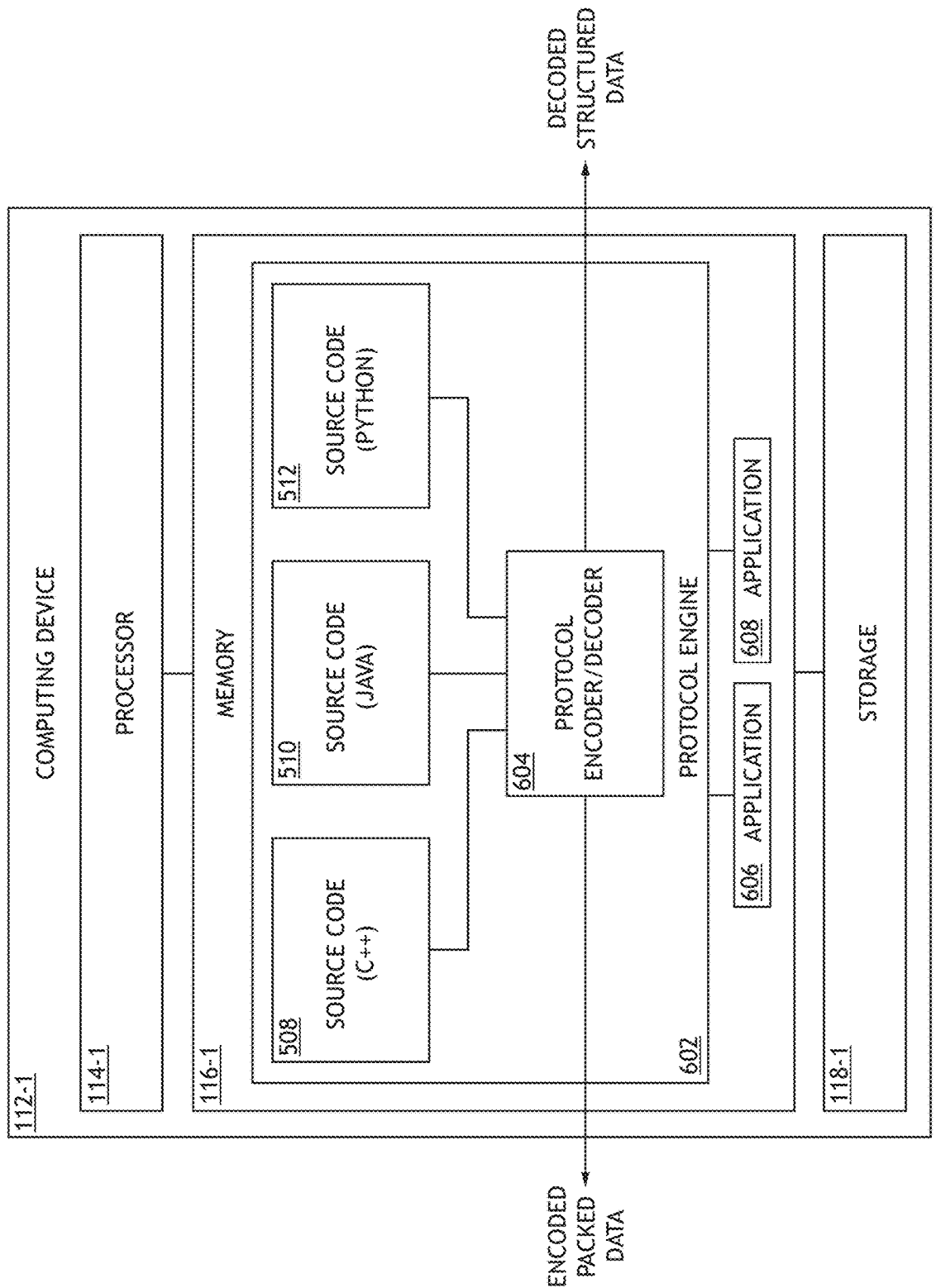
FIG. 6 is an exemplary view of the avionics computing device of FIG. 4 according to the inventive concepts disclosed herein.

Referring now to FIG. 6, the avionics computing device 112-1 of FIGS. 4-5 is shown. The avionics computing device 112-1 may include a protocol engine 602 and applications 606, 608 maintained (e.g., stored) in the memory 116-1. The protocol engine 602 may include a protocol encoder/decoder 604 and the source code 508, 510, 512. Execution of the protocol engine 602 by the processor 114-1 may convert structured data to packed data and/or convert packed data to structured data. For example, by executing the protocol engine 602 and the application 606, the processor 114-1 may be configured to receive one or more messages as protocol buffer data from a source (e.g., another application, an application of another computing device, and/or a file system), where the protocol buffer data is packed data (e.g., serialized or encoded data; e.g., byte packed data) readable by the source. Based at least on execution of the protocol engine 602, the processor 114-1 may be configured to decode the protocol buffer data into structured data. Similarly, the processor 114-1 may be configured to send one or more messages as protocol buffer data to a destination (e.g., another application, an application of another computing device, and/or a file system). For example, based at least on execution of the protocol engine 602, the processor 114-1 may be configured to encode structured data as protocol buffer data, where the protocol buffer data is packed data readable by the destination. The processor 114-1 may be configured to output the protocol buffer data to the destination.

While the avionics computing device 112-1 is exemplarily shown as having software elements as shown and described, in some embodiments, other computing devices (e.g., vetronics computing devices, avionics computing devices, non-vetronics computing devices, and/or non-avionics computing devices) may have similar software elements with similar functionality.

Figure 7:
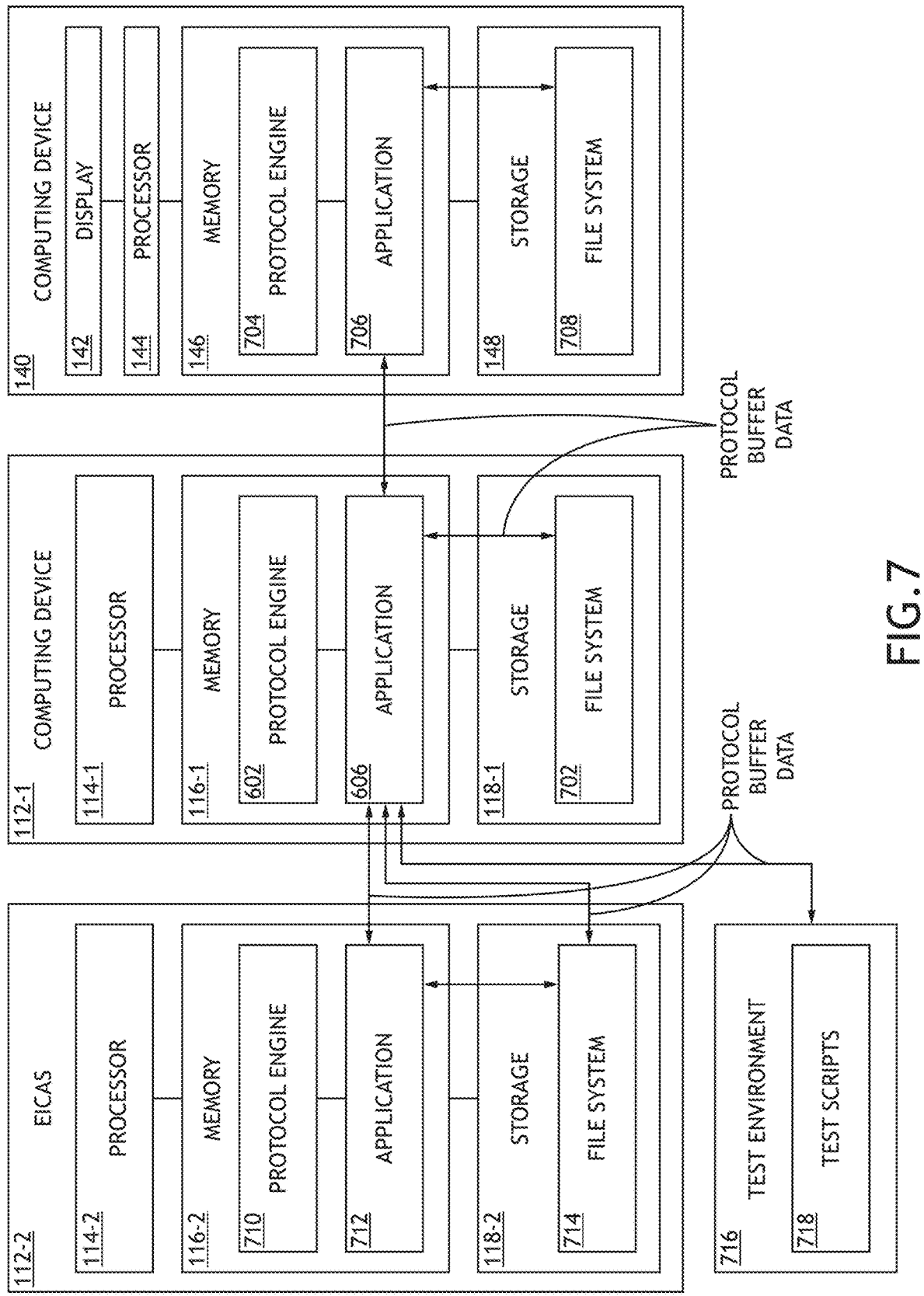
FIG. 7 is an exemplary view of computing devices of FIG. 4 according to the inventive concepts disclosed herein.

Referring now to FIG. 7, the avionics computing device 112-1 of FIGS. 4-6, the EICAS computing device 112-2 of FIG. 4, the non-avionics computing device 140 of FIG. 4, and a test environment computing device 716 are shown.

The EICAS computing device 112-2 may include a processor 114-2, memory 116-2, and storage 118-2 implemented similarly and with functionality similar to the processor 114-1, the memory 116-1, and the storage 118-1 of the avionics computing device 112-1. The test environment computing device 716 may include a processor (not shown), memory (not shown), and storage (not shown) implemented similarly and with functionality similar to the processor 114-1, the memory 116-1, and the storage 118-1 of the avionics computing device 112-1.

Each of the EICAS computing device 112-2, the non-avionics computing device 140, and the test environment computing device 716 may have a protocol engine (e.g., 704, 710) and an application (e.g., 706, 712) maintained in memory (e.g., 146, 116-2) implemented similarly and with functionality similar to the protocol engine 602 and the application 606 of the avionics computing device 112-1. Each of the applications (e.g., 606, 706, 712) may be any suitable application built with any suitable programming language (e.g., C++, Java, Python). Each of the avionics computing device 112-1, the EICAS computing device 112-2, the non-avionics computing device 140, and the test environment computing device 716 may have a file system (e.g., 702, 708, 714) maintained in storage (e.g., 118-1, 148, 118-2).

By execution of a protocol engine (e.g., 602, 704, 710) and an application (e.g., 606, 706, 712) by a processor (e.g., 114-1, 114-2, 144), the application (e.g., 606, 706, 712) may communicate (e.g., send and/or receive over a network via the data network switch 404) protocol buffer data with another application of another computing device (e.g., 112-1, 112-2, 140, 716), with a file system (e.g., 702, 708, 714), and/or with a non-volatile non-transitory computer-readable medium (e.g., memory 116-1, memory 116-2, memory 146, storage 118-1, storage 118-2, and/or storage 148).

For example, with respect to the avionics computing device 112-1, by executing the protocol engine 602 and the application 606, the processor 114-1 may be configured to receive one or more messages as protocol buffer data from a source (e.g., the application 712, the application 706, the file system 702, the file system 714, the file system 708, and/or the test environment computing device 716), where the protocol buffer data is packed data (e.g., serialized or encoded data; e.g., byte packed data) readable by the source. Based at least on execution of the protocol engine 602, the processor 114-1 may be configured to decode the protocol buffer data into structured data. For example, by executing the application 602, the processor 114-1 may utilize the structured data for application business logic to perform any of various suitable operations. In some embodiments, the processor 114-1 may configured to store the structured data and/or the protocol buffer data in a non-transitory computer readable medium such that scenarios can be recreated at a later time, such as for debugging. Similarly, for example, by executing the protocol engine 602 and the application 606, the processor 114-1 may be configured to send one or more messages as protocol buffer data to a destination (e.g., the application 712, the application 706, the file system 702, the file system 714, the file system 708, and/or the test environment computing device 716). For example, based at least on execution of the protocol engine 602, the processor 114-1 may be configured to encode structured data as protocol buffer data, where the protocol buffer data is packed data readable by the destination. The processor 114-1 may be configured to output the protocol buffer data to the destination.

For example, with respect to the EICAS computing device 112-2, by executing the protocol engine 710 and the application 712, the processor 114-2 may be configured to receive one or more messages as protocol buffer data from a source (e.g., the application 606, the application 706, the file system 702, the file system 714, the file system 708, and/or the test environment computing device 716), where the protocol buffer data is packed data (e.g., serialized or encoded data; e.g., byte packed data) readable by the source. Based at least on execution of the protocol engine 710, the processor 114-2 may be configured to decode the protocol buffer data into structured data. For example, by executing the application 712, the processor 114-1 may utilize the structured data for application business logic to perform any of various suitable operations. In some embodiments, the processor 114-2 may configured to store the structured data and/or the protocol buffer data in a non-transitory computer readable medium such that scenarios can be recreated at a later time, such as for debugging. Similarly, for example, by executing the protocol engine 710 and the application 712, the processor 114-2 may be configured to send one or more messages as protocol buffer data to a destination (e.g., the application 606, the application 706, the file system 702, the file system 714, the file system 708, and/or the test environment computing device 716). For example, based at least on execution of the protocol engine 710, the processor 114-2 may be configured to encode structured data as protocol buffer data, where the protocol buffer data is packed data readable by the destination. The processor 114-2 may be configured to output the protocol buffer data to the destination.

For example, with respect to the non-avionics computing device 140, by executing the protocol engine 704 and the application 706, the processor 144 may be configured to receive one or more messages as protocol buffer data from a source (e.g., the application 606, the application 712, the file system 702, the file system 714, the file system 708, and/or the test environment computing device 716), where the protocol buffer data is packed data (e.g., serialized or encoded data; e.g., byte packed data) readable by the source. Based at least on execution of the protocol engine 704, the processor 144 may be configured to decode the protocol buffer data into structured data. For example, by executing the application 706, the processor 144 may utilize the structured data for application business logic to perform any of various suitable operations. In some embodiments, the processor 144 may configured to store the structured data and/or the protocol buffer data in a non-transitory computer readable medium such that scenarios can be recreated at a later time, such as for debugging. Similarly, for example, by executing the protocol engine 704 and the application 706, the processor 144 may be configured to send one or more messages as protocol buffer data to a destination (e.g., the application 606, the application 712, the file system 702, the file system 714, the file system 708, and/or the test environment computing device 716). For example, based at least on execution of the protocol engine 706, the processor 144 may be configured to encode structured data as protocol buffer data, where the protocol buffer data is packed data readable by the destination. The processor 144 may be configured to output the protocol buffer data to the destination.

Additionally, for example, the test environment computing device 716 may be configured to generate (e.g., automatically generate) test scripts 718. By executing a protocol engine and an application, the test environment computing device 716 may be configured to receive one or more messages as protocol buffer data from a source (e.g., the application 606, the application 712, the application 706, the file system 702, the file system 714, and/or the file system 708), where the protocol buffer data is packed data (e.g., serialized or encoded data; e.g., byte packed data) readable by the source. For example, the received protocol buffer data may be associated with one or more of the test scripts 718. Based at least on execution of the protocol engine, the test environment computing device 716 may be configured to decode the protocol buffer data into structured data. For example, by executing the application, the test environment computing device 716 may utilize the structured data for application business logic to perform any of various suitable operations, such as testing operations. Similarly, for example, by executing the protocol engine and the application, the test environment computing device 716 may be configured to send one or more messages as protocol buffer data to a destination (e.g., the application 606, the application 712, the application 706, the file system 702, the file system 714, and/or the file system 708). For example, based at least on execution of the protocol engine, the test environment computing device 716 may be configured to encode structured data as protocol buffer data, where the protocol buffer data is packed data readable by the destination. The test environment computing device 7161 may be configured to output the protocol buffer data to the destination. For example, the sent protocol buffer data may be associated with one or more of the test scripts 718.

In some embodiments, by executing a protocol engine (e.g., 602, 704, 710) and an application, one or more of the avionics computing device 112, the EICAS computing device 112-2, the non-avionics computing device 140, and the test environment computing device 716 may be configured to sniff packed network data traffic transmitted among the plurality of avionics computing devices to determine structured data contained within protocol buffer messages of the packed network data traffic by decoding the packed network data traffic into structured data based at least on execution of a protocol engine (e.g., 602, 704, 710).

Some embodiments may include installing an additional application (e.g., a protosquid application) on one or more of the avionics computing device 112, the EICAS computing device 112-2, the non-avionics computing device 140, and the test environment computing device 716. By executing a protocol engine (e.g., 602, 704, 710) and the additional application, the additional application can simulate one of the applications 606, 706, 712 or one of the file systems 702, 708, 714. For example, the additional application may be executed for performing test interfaces and simulating applications. By executing a protocol engine (e.g., 602, 704, 710) and the additional application, packed data may be presented to a user as structured data in human readable form.

While the avionics computing device 112-1, the EICAS computing device 112-2, the non-avionics computing device 140, and the test environment computing device 716 are exemplarily shown as having software elements as shown and described, in some embodiments, other computing devices (e.g., vetronics computing devices, avionics computing devices, non-vetronics computing devices, and/or non-avionics computing devices) may have similar software elements with similar functionality.

Referring now to FIG. 8, a representation of exemplary packed protocol buffer data according to the inventive concepts disclosed herein is shown. The packed protocol buffer data is encoded in machine language (e.g., binary or hexadecimal). Typically, users would be unable to inspect the underlying data values and fields of the encoded structured data without writing specific code to convert the packed data to structured data. Writing specific code for each data structure is tedious, error-prone, and expensive. Embodiments may include executing a protocol engine (e.g., 602, 704, 710) to convert the packed data to structured data so as to reduce the likelihood of errors and reduce costs as compared to writing specific code for each data structure.

Figure 9:
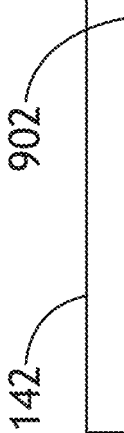
FIG. 9 an exemplary view of the display of the non-avionics computing device of FIG. 1 presenting a graphical user interface according to the inventive concepts disclosed herein.

Referring now to FIG. 9, an exemplary view of the display 142 of the non-avionics computing device 140 presenting a graphical user interface 902 according to the inventive concepts disclosed herein is shown. For example, the processor 144 may be configured to execute the protocol engine 704 to convert the packed data (e.g., as shown in FIG. 8) of a protocol buffer message to structured data. The processor 144 may be configured to generate the graphical user interface 902 based at least on the structured data. The graphical user interface 902 may include a representation of fields and data values of the structured data. The processor 144 may be configured to output the graphical user interface 902 to the display 142 for presentation to a user. The data values may be user editable. For example, a user may select a data value box to edit and edit the data value of the data value box. For example, the processor 144 may be configured to receive a user input to edit at least one of the data values. Based at least on the user input, the processor 144 may be configured to update the structured data. Additionally, based at least on execution of the protocol engine 704, the processor 144 may be configured to encode the updated structured data as updated protocol buffer data, the updated protocol buffer data being packed data readable by the destination, and the processor 144 may be configured to output the updated protocol buffer data to the destination.

While the non-avionics computing device 140 is exemplarily shown and described as being configured to generate a graphical user interface, in some embodiments, other computing devices (e.g., vetronics computing devices, avionics computing devices, non-vetronics computing devices, and/or non-avionics computing devices) may be similarly configured with similar functionality.

Figure 10:
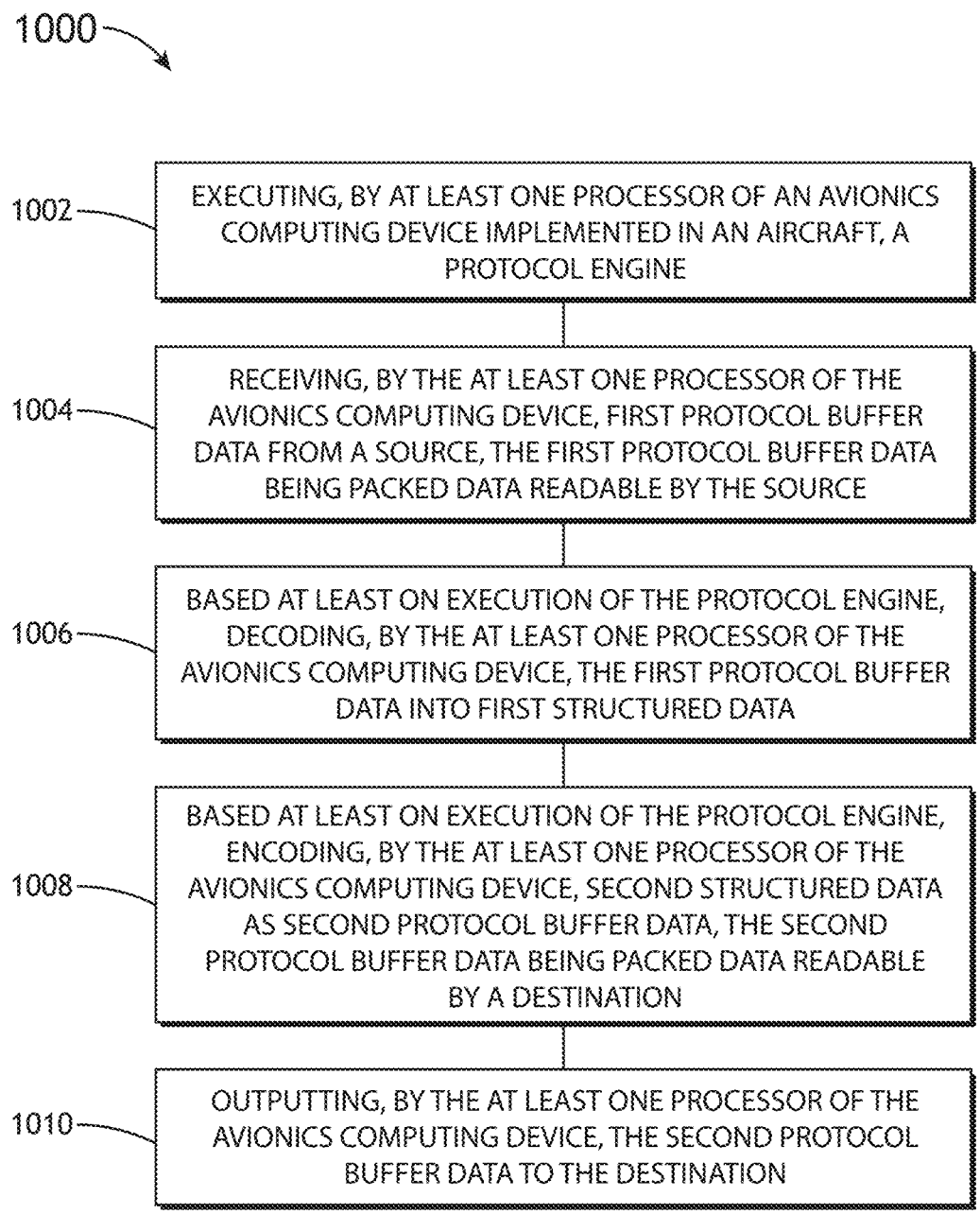
FIG. 10 is a diagram of an exemplary embodiment of a method according to the inventive concepts disclosed herein.

Referring now to FIG. 10, an exemplary embodiment of a method 1000 according to the inventive concepts disclosed herein may include one or more of the following steps. Some embodiments may include performing one or more steps of the method 1000 iteratively, concurrently, sequentially, and/or non-sequentially. Additionally, for example, some embodiments may include performing one or more instances of the method 1000 iteratively, concurrently, and/or sequentially.

A step 1002 may include executing, by at least one processor of an avionics computing device implemented in an aircraft, a protocol engine.

A step 1004 may include receiving, by the at least one processor of the avionics computing device, first protocol buffer data from a source, the first protocol buffer data being packed data readable by the source.

A step 1006 may include based at least on execution of the protocol engine, decoding, by the at least one processor of the avionics computing device, the first protocol buffer data into first structured data.

A step 1008 may include based at least on execution of the protocol engine, encoding, by the at least one processor of the avionics computing device, second structured data as second protocol buffer data, the second protocol buffer data being packed data readable by a destination.

A step 1010 may include outputting, by the at least one processor of the avionics computing device, the second protocol buffer data to the destination.

Further, the method 1000 may include any of the operations disclosed throughout.

As will be appreciated from the above, embodiments of the inventive concepts disclosed herein may be directed to a method and a system configured to utilize protocol buffer data (e.g., protocol buffer messages) for communicating with a file system and/or application of another computing device.

As used throughout and as would be appreciated by those skilled in the art, "at least one non-transitory computer-readable medium" may refer to as at least one non-transitory computer-readable medium (e.g., memory 110, memory 116, memory 146, memory 212, memory 116-1, memory 116-2, storage 118, storage 148, storage 214, storage 118-1, storage 118-2, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   at least one data network switch implemented in an aircraft; and
   an avionics computing device implemented in the aircraft, the avionics computing device communicatively coupled to the at least one data network switch, the avionics computing device comprising at least one non-transitory computer-readable medium and at least one processor communicatively coupled to the at least one non-transitory computer-readable medium, wherein a protocol engine and at least one application is maintained in the at least one non-transitory computer-readable medium, wherein by execution of the protocol engine and the at least one application, the avionics computing device is configured to:
      receive first protocol buffer data from a source, the first protocol buffer data being packed data readable by the source, the first protocol buffer data encoded in machine language;
      based at least on execution of the protocol engine, decode the first protocol buffer data into first human-readable data, the first human-readable data including at least one user-editable data value;
      receive second human-readable data, the second human-readable data including at least one user-edited data value;
      based at least on execution of the protocol engine, encode the second human-readable data as second protocol buffer data, the second protocol buffer data being packed data readable by a destination, the second protocol buffer data encoded in machine language; and
      output the second protocol buffer data to the destination,
   wherein the first protocol buffer data and the second protocol buffer data are encoded based at least on different programming languages.

2. The system of claim 1, wherein the avionics computing device is a first avionics computing device, the system further comprising:
   a second avionics computing device communicatively coupled to the first avionics computing device via the data network switch, the second avionics computing device implemented in the aircraft, the second avionics computing device comprising at least one second avionics non-transitory computer-readable medium and at least one second avionics processor communicatively coupled to the at least one second avionics non-transitory computer-readable medium.

3. The system of claim 2, wherein an application is maintained in the at least one second avionics non-transitory computer-readable medium, wherein the application is at least one of the source or the destination.

4. The system of claim 2, wherein a file system is maintained in the at least one second avionics non-transitory computer-readable medium, wherein the file system is the destination.

5. The system of claim 2, wherein the protocol engine is a first protocol engine, wherein a second protocol engine is maintained in the at least one second avionics non-transitory computer-readable medium.

6. The system of claim 1, further comprising:
   a non-avionics computing device communicatively coupled to the avionics computing device, the non-avionics computing device comprising at least one non-avionics non-transitory computer-readable medium and at least one non-avionics processor communicatively coupled to the at least one non-avionics non-transitory computer-readable medium.

7. The system of claim 6, wherein an application is maintained in the at least one non-avionics non-transitory computer-readable medium, wherein the application is at least one of the source or the destination.

8. The system of claim 7, further comprising a display, wherein the protocol engine is a first protocol engine, wherein a second protocol engine is maintained in the at least one non-avionics non-transitory computer-readable medium, wherein the non-avionics computing device is further configured to:
   generate a graphical user interface based at least on at least one of the first human-readable data and the second human-readable data, the graphical user interface including a representation of fields and data values of at least one of the first human-readable data and the second human-readable data; and output the graphical user interface to the display for presentation to a user, wherein the data values are user editable based on receipt of a user input to edit the data values.

9. The system of claim 6, wherein a file system is maintained in the at least one non-avionics non-transitory computer-readable medium, wherein the file system is the destination.

10. The system of claim 6, wherein the protocol engine is a first protocol engine, wherein a second protocol engine is maintained in the at least one non-avionics non-transitory computer-readable medium.

11. The system of claim 1, wherein the at least one non-transitory computer-readable medium comprises non-volatile non-transitory computer-readable medium, the avionics computing device being further configured to store the first protocol buffer data in the non-volatile non-transitory computer-readable medium and to recreate a scenario by replaying the first protocol buffer data based at least on execution of the protocol engine.

12. The system of claim 1, wherein the at least one non-transitory computer-readable medium comprises non-volatile non-transitory computer-readable medium, the avionics computing device being further configured to store the second protocol buffer data in the non-volatile non-transitory computer-readable medium.

13. The system of claim 1, further comprising a plurality of avionics computing devices communicatively coupled to the data network switch, wherein the avionics computing device is further configured to sniff packed network data traffic transmitted among the plurality of avionics computing devices by decoding the packed network data traffic into human-readable data based at least on execution of the protocol engine.

14. The system of claim 1, further comprising a display, wherein the avionics computing device is further configured to:
generate a graphical user interface based at least on at least one of the first human-readable data and the second human-readable data, the graphical user interface including a representation of fields and data values of at least one of the first human-readable data and the second human-readable data; and
output the graphical user interface to the display for presentation to a user, wherein the data values are user editable based on receipt of a user input to edit the data values.

15. The system of claim 1, further comprising a display, wherein the avionics computing device is further configured to:
generate a graphical user interface based at least on the second human-readable data, the graphical user interface including a representation of fields and data values of the second human-readable data; and
output the graphical user interface to the display for presentation to a user, wherein the data values are user editable;
receive a user input to edit at least one of the data values;
based at least on the user input, update the second human-readable data;
based at least on execution of the protocol engine, encode the updated second human-readable data as updated second protocol buffer data, the updated second protocol buffer data being packed data readable by the destination; and
output the updated second protocol buffer data to the destination.

16. The system of claim 1, wherein the first protocol buffer data is a test script.

17. A system, comprising:
at least one data network switch implemented in a vehicle; and
a vetronics computing device implemented in the vehicle, the vetronics computing device communicatively coupled to the at least one data network switch, the vetronics computing device comprising at least one non-transitory computer-readable medium and at least one processor communicatively coupled to the at least one non-transitory computer-readable medium, wherein a protocol engine and at least one application is maintained in the at least one non-transitory computer-readable medium, wherein by execution of the protocol engine and the at least one application, the vetronics computing device is configured to:
receive first protocol buffer data from a source, the first protocol buffer data being packed data readable by the source, the first protocol buffer data encoded in machine language;
based at least on execution of the protocol engine, decode the first protocol buffer data into first human-readable data, the first human-readable data including at least one user-editable data value;
receive second human-readable data, the second human-readable data including at least one user-edited data value;
based at least on execution of the protocol engine, encode the second human-readable data as second protocol buffer data, the second protocol buffer data being packed data readable by a destination, the second protocol buffer data encoded in machine language; and
output the second protocol buffer data to the destination,
wherein the first protocol buffer data and the second protocol buffer data are encoded based at least on different programming languages.

18. A method, comprising:
executing, by at least one processor of an avionics computing device implemented in an aircraft, a protocol engine;
receiving, by the at least one processor of the avionics computing device, first protocol buffer data from a source, the first protocol buffer data being packed data readable by the source, the first protocol buffer data encoded in machine language;
based at least on execution of the protocol engine, decoding, by the at least one processor of the avionics computing device, the first protocol buffer data into first human-readable data, the first human-readable data including at least one user-editable data value;
receiving, by the at least one processor of the avionics computing device, second human-readable data, the second human-readable data including at least one user-edited data value;
based at least on execution of the protocol engine, encoding, by the at least one processor of the avionics computing device, the second human-readable data as second protocol buffer data, the second protocol buffer data being packed data readable by a destination, the second protocol buffer data encoded in machine language; and
outputting, by the at least one processor of the avionics computing device, the second protocol buffer data to the destination, wherein the first protocol buffer data and the second protocol buffer data are encoded based at least on different programming languages.

* * * * *